US007199715B2

(12) United States Patent
Fields et al.

(10) Patent No.: US 7,199,715 B2
(45) Date of Patent: Apr. 3, 2007

(54) SYSTEM AND METHOD FOR TRACKING ID TAGS USING A DATA STRUCTURE OF TAG READS

(75) Inventors: Carla K. Fields, Neenah, WI (US); Angela R. Zillmer, Appleton, WI (US); William J. Raynor, Jr., Appleton, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 204 days.

(21) Appl. No.: 11/069,788

(22) Filed: Mar. 1, 2005

(65) Prior Publication Data

US 2006/0208887 A1    Sep. 21, 2006

(51) Int. Cl.
   *G08B 13/14* (2006.01)
(52) U.S. Cl. ................................ 340/572.1; 709/238
(58) Field of Classification Search ............. 340/572.1, 340/572.4; 709/238, 224; 235/385, 375
   See application file for complete search history.

(56) References Cited

U.S. PATENT DOCUMENTS

| 5,708,423 | A  | * | 1/1998 | Ghaffari et al. ............. 340/5.8 |
| 6,456,239 | B1 |   | 9/2002 | Werb et al. |
| 6,509,828 | B2 | * | 1/2003 | Bolavage et al. ............ 340/10.1 |
| 6,993,592 | B2 | * | 1/2006 | Krumm et al. .............. 709/236 |
| 7,020,701 | B1 | * | 3/2006 | Gelvin et al. ............... 709/224 |
| 7,103,886 | B2 | * | 9/2006 | Haller et al. ................. 718/100 |
| 7,113,099 | B2 | * | 9/2006 | Tyroler et al. ............ 340/573.4 |
| 2003/0177025 | A1 |   | 9/2003 | Curkendall et al. |
| 2005/0108044 | A1 |   | 5/2005 | Koster |
| 2006/0049250 | A1 |   | 3/2006 | Sullivan |

FOREIGN PATENT DOCUMENTS

| WO | WO 03/069508 A2 | 8/2003 |
| WO | WO 2005/054565 A1 | 6/2005 |

OTHER PUBLICATIONS

O'Connor, M., "Bar Coding for Item Tracking," RFID Journal, undated (printed from www.rfidjournal.com on Jan. 12, 2005), 3 pages.

* cited by examiner

*Primary Examiner*—John Tweel, Jr.
(74) *Attorney, Agent, or Firm*—Senniger Powers

(57) ABSTRACT

A system and method of tracking tags at several successive points of a business process. A reader attempts to read each tag at each successive point. A processor populates a database with information corresponding to the reading of each tag at each successive point and the time of each reading. A tool modifies part of the information in the database as a function of other information in the database. The modified information is used to track the tags through the business process.

29 Claims, 3 Drawing Sheets

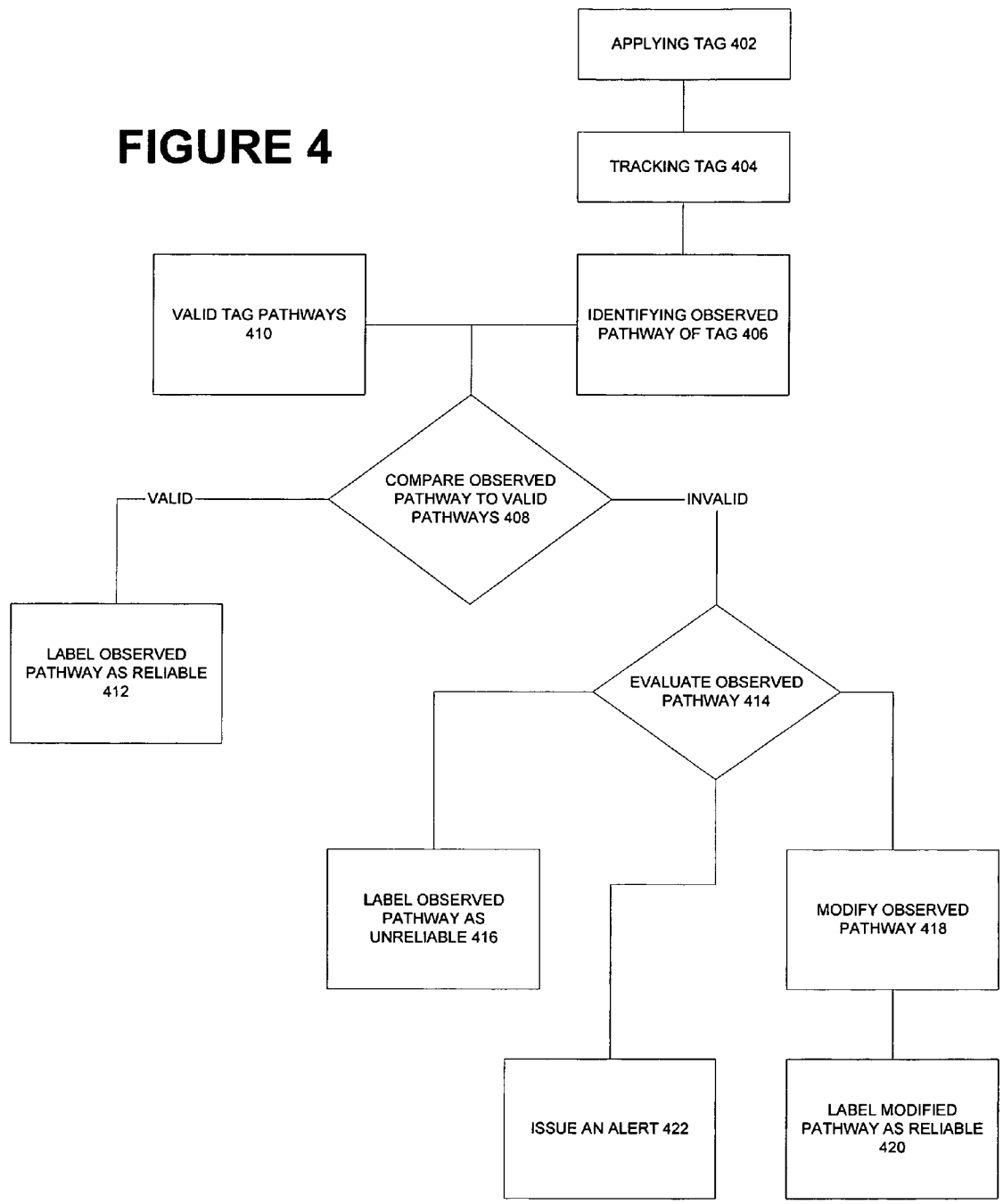

SYSTEM AND METHOD FOR TRACKING ID TAGS USING A DATA STRUCTURE OF TAG READS

BACKGROUND OF INVENTION

The invention generally relates to tag tracking systems. In particular, it relates to a radio frequency identification (RFID) tag tracking system which tracks tags at several successive points and uses the tracking information to control a business process, such as a product supply chain. Furthermore, the invention relates to the use of such tracking information for adjusting the handling of the products during the supply chain and for varying the supply of additional products to the supply chain.

RFID tags have been used to track the location of products or other physical objects. As the cost of RFID tag systems continues to decrease and as system accuracy continues to improve, RFID tags are being used to generate information to assist in the handling of products carrying the tags. Each tag has a unique electronic product code (EPC) which can be read at successive points along a supply chain to provide information which is used to determine key performance indicators (KPI) of the chain.

Two terms are used in conjunction with KPIs: accuracy and precision. For RFID systems, accuracy represents the ability of the RFID equipment to read the tag's electronic product code (EPC) every time. Precision represents the sharpness of the tag read accuracy definition. Since the tag read accuracy is a basic formula (total actual reads/total expected reads), the precision is an important aspect, i.e., how you apply the calculation at each read point.

Because of variations in precision, a system which has several successive read points may have poor reads at some points which result in missing data. There have been some attempts in the past to infer missing data to increase precision. Other attempts at increasing precision ignore missing data and rely on good data only. There is a need for RFID systems which have increased precision so that the resulting information can be relied upon to adjust business processes monitored by the RFID systems.

SUMMARY OF THE INVENTION

The systems and methods of the invention address the above shortcomings and others by collecting time-stamped readings of the tags so that missing data for a tag at a particular time can be inferred from data for the tag at a other times.

As a result, the systems and methods of the invention reduce distribution center (DC) and back office/administrative labor costs through elimination of the manual entry of warehouse data by tracking internal movements and cycle counting processes and by tracking such business processes as Receipt & Put Away, and Pick, Pack & Ship. The invention also reduces overage, shortage and damage (OS&D) write-offs because it can be used with a receiving discrepancy process to reduce such deductions. It also reduces transportation costs by maximizing asset utilization and operational efficiency as well as providing better availability of in-transit shipping information. Another aspect is reduced finished goods (FG) inventory (safety stock) by analyzing inventory movement to identify ways to reduce supply chain variability thereby enabling safety stock reduction.

The system and method improves shelf availability by tracking products through the supply chain to increase consistency in movement and sale of product. Improved shrink management is established by an audit trail for each manufacturer to track exactly where and when the shipment begins to "shrink". Improved promotional planning and execution results because the invention permits tracking compliance with a promotion and measuring the effectiveness of the in-store promotion.

In one form, the invention comprises a method of tracking tags at several successive points of a business process. The method comprises:
  attempting to read each tag at each successive point;
  populating a database with information corresponding to the reading of each tag at each successive point and the time of each reading;
  modifying part of the information in the database as a function of other information in the database; and
  using the modified information to track the tags through the business process.

In another form, the invention comprises a system of tracking tags at several successive points of a business process. A reader reads each tag at each successive point and the time of each reading. A processor responsive to the reader stores in a database information corresponding to the reading of each tag at each successive point and the time of each reading. A tool modifies part of the information stored in the database as a function of other information stored in the database whereby the modified information is used to track the tags through the business process.

In another form, the invention comprises a method of supplying products carrying tags wherein the products are handled in a supply chain during which the products and their tags pass several tag reading points. The method comprises:
  populating a database with information corresponding to the reading of each tag at each tag reading point and the time of each reading;
  modifying part of the information in the database as a function of other information in the database; and
  adjusting the supply chain as a function of the modified information.

In another form, the invention comprises a method for use with an tag-enabled supply chain system for handling errors in tag tracking. The method comprises:
  applying a tag with an electronic product code to a package;
  tracking the package at a plurality of locations in a supply chain using tag readers in electronic communication with a central tag information system to create tracking information in a database that includes time and location information associated with the reading of the tag by the readers;
  identifying the observed pathway of the product based on the tracking information;
  comparing the observed pathway of the product to a compilation of valid pathways for products in the supply chain to determine if the observed pathway corresponds to a valid pathway;
  storing the observed pathway in the database if it matches a valid pathway; and
  modifying the observed pathway if it corresponds to a valid pathway and storing the modified pathway in the database.

In another form, the invention comprises a method of improving the accuracy of a tag-enabled supply chain system. The method comprises:
  Applying tags to products in a supply chain, and associating tag code information with the products in the supply chain;

Tracking the products with tag readers at multiple locations in a supply chain, such that the time and location of tag reads are stored in a database of information about the supply chain;

Identifying an acceptable delay time between a first tag reader and a second tag reader in the supply chain, the first and second tag readers being successive on an intended pathway for the products;

In response to a product being read by the first tag reader but not yet having been read by the second tag reader within the acceptable delay time, issuing an alert indicating that a problem may have occurred.

Other objects and features will be in part apparent and in part pointed out hereinafter.

BRIEF DESCRIPTION OF THE DRAWINGS

FIG. 4 is a flow chart illustrating one embodiment of a method according to the invention for populating the database.

Corresponding reference characters indicate corresponding parts throughout the drawings.

DETAILED DESCRIPTION OF THE INVENTION

Figure 1:
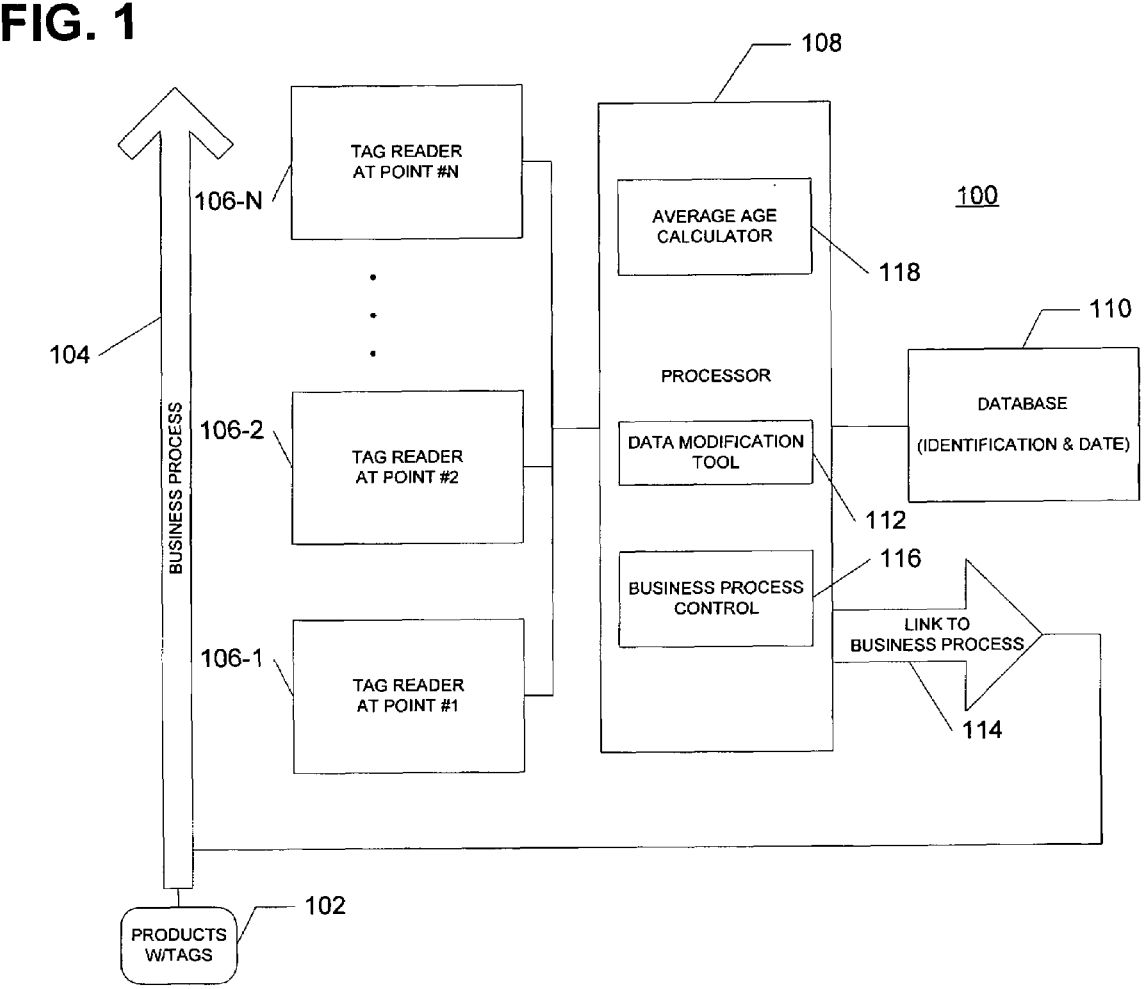
FIG. 1 is a block diagram of one embodiment of a system according to the invention.

Referring to FIG. 1, a block diagram of one embodiment of a system 100 according to the invention is illustrated. The system 100 tracks tags 102 at several successive points of a business process 104. For example, the tags 102 may be affixed to or otherwise carried by products which are part of the supply chain or other business process 104. In one embodiment, the tags 102 may be active or passive RFID tags. However, it is contemplated that the tags 102 may be any device or marking that identifies a product or process. For example, in addition to RFID tags, the tag may be an optical tag or marking, a bar code, a serialized bar code, a UPC, a serial number, a model number or any other device or marking. Hereinafter, the various embodiments of the invention will be described with respect to tags and particularly RFID tags, it being understood that a tag may be any device or marking.

Generally, the supply chain has a plurality of readers 106-1 to 106-N at fixed read points or otherwise at known locations. The readers 106 at each read point attempt to read the tags 102 as the tags pass by or come in proximity to the readers so that the tags 102 are read and tracked or monitored at successive read points. The expected EPCs which will enter the business process, the order in which read points 106 will receive tags 102, the approximate distance between read points 106 and approximate time it takes for product to travel between read points 106 is known. The readers record both the identification of each tag 102 which is read and the time at which each tag 102 is identified. As noted below, this recorded information along with the known information (expected EPCs, the order that readers will be encountered, the distance between readers and the time between reads by readers) may be used to infer missing data from failed or incomplete attempts to read tags.

The read information from each reader 106 is provided to a processor 108 which responds to reads by the readers 106 and stores information in a database 110. Among other things, the information corresponds to the tags 102 which are read and may include the identity of each tag 102 (as it comes into proximity with each successive reader so that each tag is capable of being read) and the time of each reading.

In general, each reader 106 attempts to read each tag 102 as the tags come into proximity to the reader 106. However, unless the system is configured to produce 100% accuracy in that every tag 102 is read at every read point, there will be points along the business process 104 at which one or more of the readers 106 will be unable to accurately read one or more of the tags 102 even though the tags 102 are within proximity to the readers 106. In other words, the system 100 attempts to read each tag 102 at each read point, but some of the attempted reads may fail. This results in missing data in the database 110 in the form of no read information for missed tags at read points 106 which fail to read the missed tag as the missed tags pass by the read points.

According to one embodiment of the invention, a data modification tool 112 such as a software module executed by processor 108 modifies part of the information stored in the database 110 as a function of other information stored in the database 110 so the modified information may be used to track the tags 102 through the business process 104. Alternatively, this process including modifying may be partially or wholly performed manually by an operator reviewing the data. In either case, modifications such as corrections or revisions to information regarding each tag may be updated once or several times during the business process 104.

As an example of missing data and how it is inferred according to the invention, consider that database 110 may include a data structure having a cell for storing information corresponding to the reading of each tag 102 by each successive reader 106. Each cell would receive information indicating whether the tag corresponding to the cell has been read by the reader corresponding to the cell. The information stored in the cell may include any of the following which is intended as exemplary and not limiting:

state, time, interval (e.g., open, closed, right, left, etc.), distribution to a missing point. Further the system could be extended to accommodate a plurality of indicators and tags associated with one or more items being tracked. Referring to TABLE 1, a data structure according to one embodiment of the invention is illustrated.

TABLE 1

| DATA STRUCTURE | | | | | | | |
|---|---|---|---|---|---|---|---|
| 106-1 | | 106-2 | | 106-3 | | 106-4 | |
| ID | Date | ID | Date | ID | Date | ID | Date |
| A | | | | | | | |
| B | | | | | | | |
| C | | | | | | | |
| D | | | | | | | |

Each pair of columns corresponds to one of the tag readers 106 and each row corresponds to one of tags. The left column of each pair of columns of each reader indicates the identification (ID) information collected by the reader and the right column indicates the date that the ID information was collected. In TABLE 1, columns for readers 106-1 through 106-4 are shown and rows for tags A through D are shown. Additional columns and rows corresponding to additional readers and tags may be added, depending on the size of the system 100. Thus, the two cells in column 106-1, row A would include ID and date information regarding the reading of tag A by reader 106-1; the two cells in column 106-2, row A would include ID and date information regarding the reading of tag A by reader 106-2; the two cells in column 106-1, row B would include ID and date information regarding the reading of tag B by reader 106-1, and so on. The processor 108 stores in each corresponding cell of the data structure information indicating whether or not each tag was read at each successive reader. In cells where data is missing, the tool 112 modifies the information in the cell as a function of other cells in the data structure.

For example, in one embodiment, the processor 112 stores a "1" in each ID cell corresponding to a particular tag when a reading of the particular tag by a particular reader is expected and the reading of the particular tag occurs. The processor 112 also stores the time of the reading in the corresponding date cell. The processor stores a "0" in each ID cell corresponding to a particular tag when a reading of the particular tag by a particular reader is expected and the reading of the particular tag does not occur. The processor 112 stores nothing in each ID cell corresponding to a particular tag when a reading of the particular tag by a reader is not expected and the reading of the particular tag does not occur.

As another example, in one embodiment, the processor 112 stores a first probability (e.g., 1 to 100%) in each ID cell corresponding to a particular tag when a reading of the particular tag by a particular reader is expected and the reading of the particular tag occurs. The processor 112 also stores the time of the reading in the corresponding date cell. The processor stores a second probability (e.g., zero to 99%) in each ID cell corresponding to a particular tag when a reading of the particular tag by a particular reader is expected and the reading of the particular tag does not occur. The processor 112 stores nothing in each ID cell corresponding to a particular tag when a reading of the particular tag by a reader is not expected and the reading of the particular tag does not occur.

In one embodiment, partial reads of a tag may be treated in a particular way. For example, if a partial read is detected, the system may probabilistically assign to the read one or more missing items or flag the read as a problem or identify the read problem (e.g., echoes, partially obstructed by a person or thing, other adjacent tags interfering with the read, etc.).

As a specific example, consider a system wherein the tags A, B, C and D are associated with products which carry the tags, and wherein the products are handled in a supply chain during which the products and their tags successively pass tag readers 106-1, 106-2, 106-3 and 106-4. Assuming all readers read all tags, the data structure would be as shown in TABLE 2.

TABLE 2

| | \multicolumn{8}{c}{DATA STRUCTURE} | | | | | | | |
|---|---|---|---|---|---|---|---|---|
| | \multicolumn{2}{c}{106-1} | \multicolumn{2}{c}{106-2} | \multicolumn{2}{c}{106-3} | \multicolumn{2}{c}{106-4} |
| | ID | Date | ID | Date | ID | Date | ID | Date |
| A | 1 | 12:10 | 1 | 12:20 | 1 | 12:30 | 1 | 12:40 |
| B | 1 | 12:10 | 1 | 12:20 | 1 | 12:30 | 1 | 12:40 |

TABLE 2-continued

| | \multicolumn{8}{c}{DATA STRUCTURE} | | | | | | | |
|---|---|---|---|---|---|---|---|---|
| | \multicolumn{2}{c}{106-1} | \multicolumn{2}{c}{106-2} | \multicolumn{2}{c}{106-3} | \multicolumn{2}{c}{106-4} |
| | ID | Date | ID | Date | ID | Date | ID | Date |
| C | 1 | 12:10 | 1 | 12:20 | 1 | 12:30 | 1 | 12:40 |
| D | 1 | 12:10 | 1 | 12:20 | 1 | 12:30 | 1 | 12:40 |

Suppose that the products carrying tags C and D are removed from the supply chain between readers 106-2 and 106-3. Assuming all readers read all tags, the data structure would be as shown in TABLE 3.

TABLE 3

| | \multicolumn{8}{c}{DATA STRUCTURE} | | | | | | | |
|---|---|---|---|---|---|---|---|---|
| | \multicolumn{2}{c}{106-1} | \multicolumn{2}{c}{106-2} | \multicolumn{2}{c}{106-3} | \multicolumn{2}{c}{106-4} |
| | ID | Date | ID | Date | ID | Date | ID | Date |
| A | 1 | 12:10 | 1 | 12:20 | 1 | 12:30 | 1 | 12:40 |
| B | 1 | 12:10 | 1 | 12:20 | 1 | 12:30 | 1 | 12:40 |
| C | 1 | 12:10 | 1 | 12:20 | | | | |
| D | 1 | 12:10 | 1 | 12:20 | | | | |

Suppose that the products carrying tags C and D are not removed from the supply chain between readers 106-2 and 106-3 but, for some reason, reader 106-3 fails to read tags C and D. The data structure would be as shown in TABLE 4.

TABLE 4

| | \multicolumn{8}{c}{DATA STRUCTURE} | | | | | | | |
|---|---|---|---|---|---|---|---|---|
| | \multicolumn{2}{c}{106-1} | \multicolumn{2}{c}{106-2} | \multicolumn{2}{c}{106-3} | \multicolumn{2}{c}{106-4} |
| | ID | Date | ID | Date | ID | Date | ID | Date |
| A | 1 | 12:10 | 1 | 12:20 | 1 | 12:30 | 1 | 12:40 |
| B | 1 | 12:10 | 1 | 12:20 | 1 | 12:30 | 1 | 12:40 |
| C | 1 | 12:10 | 1 | 12:20 | 0 | $12:30^+$ | 1 | 12:40 |
| D | 1 | 12:10 | 1 | 12:20 | 0 | $12:30^+$ | 1 | 12:40 |

In this case, the processor 108 executes the data modification tool 112 to modify the information in the cells having information relating to tags C and D as read by reader 106-3. The information is modified as a function of other information in other cells in the data structure. In TABLE 4, tag C was read by reader 106-2 at 12:20 and by reader 106-4 at 12:40. Thus, the $12:30^+$ times for tags C and D are expected times. The 0 in the ID column of reader 106-3 indicates missing data because tag C should have been read by reader 106-3 at 12:30. A similar analysis applies to tag D. After execution of tool 112, the data structure would be as shown in TABLE 5 (with the * indicating the modified data).

TABLE 5

| | \multicolumn{8}{c}{DATA STRUCTURE} | | | | | | | |
|---|---|---|---|---|---|---|---|---|
| | \multicolumn{2}{c}{106-1} | \multicolumn{2}{c}{106-2} | \multicolumn{2}{c}{106-3} | \multicolumn{2}{c}{106-4} |
| | ID | Date | ID | Date | ID | Date | ID | Date |
| A | 1 | 12:10 | 1 | 12:20 | 1 | 12:30 | 1 | 12:40 |
| B | 1 | 12:10 | 1 | 12:20 | 1 | 12:30 | 1 | 12:40 |
| C | 1 | 12:10 | 1 | 12:20 | 1* | 12:30* | 1 | 12:40 |
| D | 1 | 12:10 | 1 | 12:20 | 1* | 12:30* | 1 | 12:40 |

Referring again to FIG. 1, processor 108 includes a link 114 to the business process 104. The processor 108 and an optional business process control software module 116 provide data structure information to the business process 104 via the link 114. The business process 104 uses the information to adjust its process so that, as a result, the processor 108 executes business process control software 116 to adjust the business process 104 as a function of the modified (*) information in the database.

In the case where the business process is a supply chain, the modified information provided to the business process by the processor and business process control would result in varying the supply of additional products to the supply chain as a function of the modified information in the data structure in the database. For example, if the business process were provided with TABLE 4 information, the process may increase the supply of the products carrying tags C and D due to the misread by reader 106-3. On the other hand, if the business process were provided with TABLE 5 information including the modified information, the business process may maintain the supply of the products carrying tags C and D because of the modified information in the cells of reader 106-3.

In one embodiment, the information in the data structure would include legacy information such as the amount of time it takes for a tag and its product to move from one reader to the next. Thus, the modified information in the data structure comprises legacy information. In the embodiment where the business process is a supply chain, the control 116 would be a supply chain control for adjusting the supply of additional products to the supply chain as a function of the modified information in the data structure in the database 108.

In another embodiment, the processor 108 provides information to the business process 104 via link 114 to adjust the handling of the products during the business process 104 as a function of the modified information in the data structure in the database 110. For example, the modified information may be used by an imputation calculator such as a mean calculator or an average age calculator 118 of the processor 108 to determine average age of a product in a supply chain. As a result, the information provided by the average age calculator 118 may be provided to the supply chain via link 114 to adjust the handling of the products during the supply chain as a function of the modified information in the database. In general, imputing average age is only one form of imputation contemplated by the invention. Additionally, different forms of imputation may be used and various forms of imputation may be used at different stages of a process. For real time fills, historic average may be used to impute a value. Later in a process, a more complex imputation such as a probabilistic or logic-based imputation may be employed. Further, multiple imputations may be used simultaneously. The imputed information may be used to adjust the handling of the products during the supply chain as a function of the modified information in the database. Also, bounds, ranges or limits may be placed on imputed values.

As used herein with regard to one embodiment, a "missed read" refers to the failure of an RFID reader to detect an RFID tag that passed near the reader and should have been read. In a missed read event, the product is tagged and passes near the reader, but is not detected, possibly due to interference, poor signal strength, a damaged RFID tag, or a defective RFID reader, etc. A "no-read event" refers to the failure of an RFID reader to detect a tag that was intended to pass near the RFID reader to be read; a no-read event may be due to a missed read or due to missing product. A "missing product event" refers to a product that does not physically reach an intended location. This can be due to diversion or theft, a problem in conveying or shipping the product, physically moving the object to an unexpected location, etc.

Figure 2:
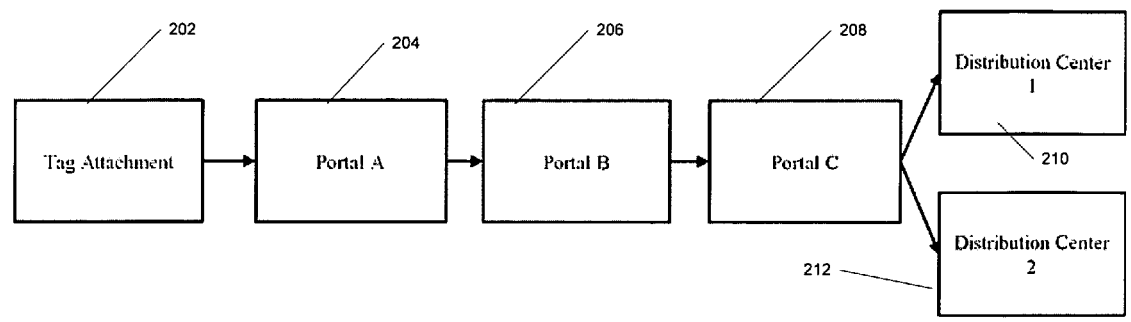
FIG. 2 shows a portion of a hypothetical supply chain in which a product is initially tagged with an RFID label, then routed through several locations equipped with RFID readers.

The paths that boxes, pallets, or individual items take through the supply chain can be tracked and analyzed with the system of the present invention. Some paths may be indicative of a problem which may require remedial action. For example, FIG. 2 shows a portion of a hypothetical supply chain in which a product is initially tagged 202 with an RFID label, then routed through several locations equipped with RFID readers, portal A 204, portal B 206, and portal C 208, after which the product may be shipped to one of two distribution centers, distribution center 1 210 or distribution center 2 212, each of which has an RFID scanner to read the tags of products as they are received. In this portion of a supply chain, products are expected to take one of two paths, which can be written as A-B-C-DC1 (portal A, then portal B, then portal C, then distribution center 1) or A-B-C-DC2.

The electronic product code of the product's RFID label can be associated with information about the product, including the intended destination of the product. If the product is listed as being bound for distribution center 1, but is detected at distribution center 2, then a problem has occurred which can be resolved in one of several ways (e.g., keeping the product at distribution center 1 and modifying a database to indicate a new destination of the product, or shipping the product back to the intended distribution center, etc.). The detection of the product in an unexpected location can trigger an alarm that may result in email being sent to a supervisor to seek directions, or automatic actions may be taken to resolve the problem. The problem and any actions taken toward its resolution can be stored in a database and archived to create an audit trail. For example, if a read is not expected and received, an alarm may be activated and/or an adjustment may be implemented.

In addition to the typical expected paths, A-B-C-DC1 and A-B-C-DC2, a variety of apparent paths may be observed due to missed reads of RFID tags. For example, if the reader at portal C fails to detect a tag for a product being shipped to distribution center 1, the apparent path observed may be A-B-DC1. In this case, because portal C is the expected portal the tag passed through, and because the tag was read at a subsequent reader at distribution center 1, it can be inferred that the tag did pass through portal C. A database can be updated by either filling in the previously missed information for portal C (e.g., writing an estimated time that the tag passed through portal C) or by adding a record indicating that the read at portal C was missed, and giving the estimated time that the tag passed through C. The fact that the read at portal C was missed may be valuable information in characterizing the performance of the system, and can be written in a database of information about the performance of the RFID system (multiple databases may be used, or a single database can contain, for example, information about product motion, product reads, and missed reads, which could be used not only for tracking products but also for evaluating the performance of an RFID system).

Over time, the compilation of data about missed reads can be used to characterize the reliability of components of an RFID-enabled the supply chain. For example, if portal C is observed to have a high number of missed reads, such as 10% or more missed reads for one or more product types, failure to read a tag expected to have arrived at that portal can be interpreted as a likely missed read demanding no immediate action rather than interpreting it as a missing product. More complex paths may be encountered and interpreted by the system. For example, an apparent path of A-B-C-B-C-DC1 may indicate that a product that passed through portal C was taken backwards in the supply chain to a point before portal B. In this case, a box may have fallen off a conveyor belt and have been manually put back on the conveyor belt upstream in the process, or it may have been sent back for repacking, cleaning, or testing and then returned to a conveyor prior to portal B.

Figure 3:
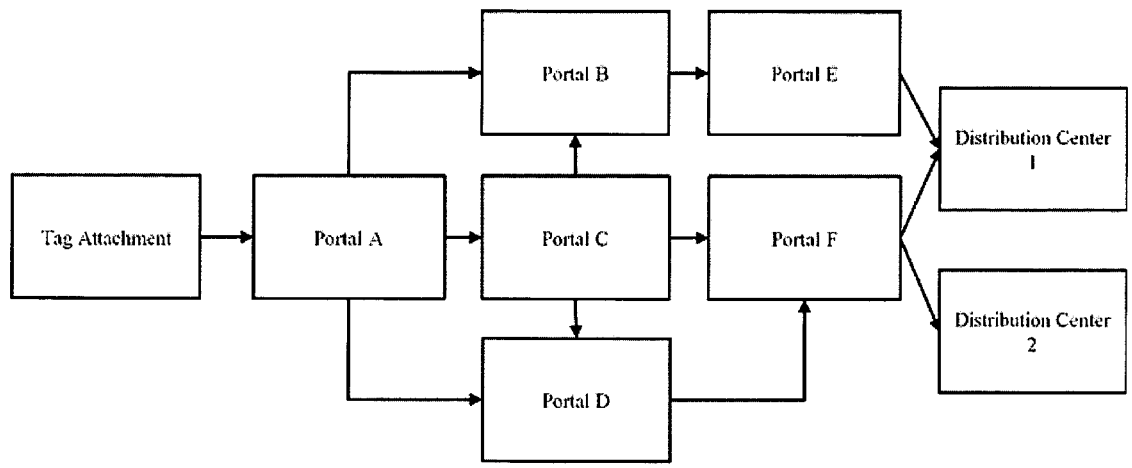
FIG. 3 shows a supply chain with multiple pathways that can result in ambiguity when there are gaps in the observed RFID path.

The system of the present invention can include means for tracking the variety of paths detected. For example, a frequency of observation may be associated with a path to create a profile of previously encountered paths and their likelihood. Each path may also be associated with a preferred response or set of responses to consider. Some paths, for example, may be known to be the result of problems requiring action (e.g., theft, an equipment malfunction, improper training of a new employee, etc.). When such a path is encountered, an alert may be generated to call for corrective action or to automatically initiate corrective action or an investigation into the possible problem. In some cases, there are multiple possible paths that an object may take, making it difficult to fill in gaps in a path when there appear to be missed reads. For example, FIG. 3 shows a supply chain with multiple pathways that can result in ambiguity when there are gaps in the observed RFID path. For example, two possible pathways are A-C-F-DC1 and A-D-F-DC1. If a tag following the former pathway is not read by the reader at portal C, the resulting observed pathway (observed through RFID reads) is A-F-DC1, a pathway which can be recognized as probably indicating a missed read, but without further information it cannot be determined for sure if the missed read occurred at portal C or D. If information associated with the RFID tag in question indicated that it was being routed through one of the two candidate pathways, then the intended pathway may be taken as the actual pathway, unless there is still a significant chance that the alternate pathway may have been followed in spite of the intended pathway. Information about the performance histories of the portals can also help resolve the actual path. For example, if historical data shows that portal C suffers many missed reads while portal D almost never has missed reads, then it may be assumed that the missed read occurred at portal C.

When the actual path cannot be identified with complete confidence from two or more candidate paths when there appears to have been at least one missed read, then the estimated probabilities for the two or more candidate paths can be applied, following basic concepts from logic and assigning an event partly to each of two mutually exclusive states.

In the absence of other information to clarify the actual path taken, a database can indicate that there was a missed read at portal C with a probability of $L_C$ and a missed read at portal D with a probability of $L_D$. The probability values may be adjusted based on other information as well, such as knowledge of the intended route for the product, or knowledge of the likelihood of a missed read for portals C and D.

A precedence table can be constructed of the expected or known pathways that objects can take in the supply chain, and when unusual or new pathways are encountered, they can be evaluated in terms of the precedence table to determine if unusual errors have occurred or to call for additional investigation or to take other remedial measures. The precedence table can be built by observing valid paths that have occurred in the past. For example, the system of FIG. 3 may have a precedence table for intended pathways similar to that shown in Table 6. A portion of a table compiling unintended but observed pathways and their frequency of occurrence is shown in Table 7. Both tables are hypothetical examples only.

TABLE 6

Precedence Table for Intended Pathways

| Path | Typical No. Events/Unit Time |
|---|---|
| A-C-F-DC1 | 500 |
| A-C-F-DC2 | 100 |
| A-B-E-DC1 | 150 |
| A-D-F-DC1 | 75 |
| A-D-F-DC2 | 20 |
| A-C-B-E-DC1 | 200 |
| A-D-F-DC1 | 5 |
| A-D-F-DC2 | 50 |

TABLE 7

Precedence Table for Observed but Unintended Pathways

| Path | Events/Unit Time | Comments |
|---|---|---|
| A-F-DC1 | 4 | Missed read: C |
| A-C-DC2 | 2 | Missed read: F |
| A-C-F-F-DC1 | 15.2 | Case removed for testing, returned |
| A-C-F-F-DC2 | 3 | Case removed for testing, returned |
| A-D-F | 32 | Missed read at DC1 8%, shrinkage 92% |
| A-C-D-B-E-DC1 | 2 | Manual rerouting error |
| A-D-DC1 | 1 | Missed read: F |
| A-D-DC2 | 4 | Missed read: F |
| A-C | 2 | Shrinkage |
| C-F-DC2 | 3 | Missed read: A |
| A-D-F | 4 | Misrouting to inventory 75%, shrinkage 25% |
| ... | | |

The comments in Table 7 can be based on analysis of the events that led to an unintended pathway. Missed reads can be identified, or other events can occur leading to an unintended pathway. In some cases, it may not be possible to resolve the causes of the observed unintended pathways, resulting in assignment of two or more possibilities to a pathway, optionally with probabilities assigned (e.g., the pathway A-D-F may be due to a missed read at DC1 or to shrinkage, with shrinkage being the more likely cause of most such events).

When future unintended pathways are observed, the system of the present invention can compare the observed pathway with the information of a precedence table such as that of TABLE 6, and determine the likely cause of the event. In some cases, remedial action may be needed. For example, if the observed pathway is A-D-F, the product may have been misrouted internally (75% probability) and should be found and shipped to the proper location. When shrinkage appears to have occurred, immediate action may be needed to identify a possible thief and retrieve the product. When the problem appears to be a missed read, immediate action may not be needed, but if a reader has a high number of missed reads, engineers may need to further optimize the portal or other system having the trouble. Optimization may involve changing the reader or its position, reducing interference, or even redesigning packaging, the antenna type used on the RFID tag, etc. Of course, new observations of unintended pathways can be used to continually update a precedence table or a database of information about pathways and products.

Pathways can be observed and analyzed at the reader level or at the logical level. The reader level includes information on the specific readers that are used to observe the tag as it travels through the supply chain (e.g., Vendor Portal A, Vendor Portal B, Portal 3 at Distribution Center 1, Portal 2 at Store 31's Receiving Dock, and Shelf 213 at Store 31). Similar but less detailed information can be presented more broadly at the logical level (e.g., Vendor Packaging—Vendor Shipping—DC1—Receiving Dock at Store 31—Shelf).

Observed information about products and pathways can include categorical information such as product type, packaging type, RFID label type, antenna type, designate customer, time of year, etc. This information may be used to create precedence tables for specific categories. For example, the pathways observed for products shipped to one customer may be different than the pathways for a second customer, especially when the supply chain information includes RFID reads from the customer, or when the products for different customers may require different handling (e.g., extra steps for testing or specialized packaging). For example, a typical pathway for a product after leaving a distribution center may show that product being received at a loading dock, going to inventory, then going to the floor of a retail store. For a different customer, the typical pathway may show the product first going to the floor of the store for placement on shelves, with excess product then being returned to inventory.

Information from a precedence table or other database can be filtered to take into account the product type, intended customer, etc., for products as they are tracked in the supply chain, and the validity of a pathway can then be more accurately assessed. A pathway may be observed that is valid for some products, but if not valid for the product type or customer for the current product, an alert can be issued and corrective action or investigation initiated.

Thus, the invention may comprise an RFID-enabled supply chain system for handling errors in RFID tracking, comprising:

applying at 402 an RFID tag 102 with an electronic product code to a package;

tracking at 404 the package at a plurality of locations (points 1-N) in a supply chain 104 using RFID readers 106 in electronic communication with a central RFID information system (processor 108) to create tracking information in a database 110 that includes time and location information associated with the reading of the tag by the RFID readers;

identifying at 406 the observed pathway of the product based on the tracking information; and comparing at 408 the observed pathway of the product to a compilation of valid pathways 410 for products in the supply chain to determine if the observed pathway is a valid pathway.

If the comparison indicates that the observed pathway matches a valid pathway, then the observed pathway is optionally labeled as reliable at 412 and stored in the database. On the other hand, if the comparison indicates that the observed pathway does not match a valid pathway, then the observed pathway is evaluated at 414 as noted above.

Among other things, the evaluation may indicate that the observed pathway is unreliable and it is optionally labeled as such at 416. Alternatively, the evaluation may indicate that the observed pathway may be modified to be reliable in which case the pathway is modified at 418 and optionally labeled as reliable (and/or modified) at 420. Alternatively, or in addition, the evaluation may issue an alert at 422.

For example, the evaluation may indicate that the observed pathway is not a valid pathway so that the system determines if the invalid pathway is likely due to one or more missed reads by RFID readers in the RFID-enable supply chain. As another example, the evaluation may indicate one or more missed reads, so that the system adds information to the database to identify a valid pathway that the product traveled, the valid pathway including information about the readers that experienced missed reads.

The added information can also include the estimated time that the product traveled to the readers that suffered missed reads.

The system also provides means for examining partial pathways. For example, after a pathway such as A-D has been observed, there is the possibility that additional reads will occur. By observing the time since read at portal D occurred, the system can determine if the typical time for a successive read has been exceeded by some threshold and then treat the path as if it has been completed. The path A-D is not a valid path, so an alarm can be sent indicating that some problem has occurred causing premature termination of a path or an unusual delay of successive reads, suggesting that, for example, the product has been damaged, stolen, fallen off a conveyor, misrouted, etc. If it later shows up further down in the supply chain, one or more missed reads may have occurred and can be inferred, and the database or databases of information about the products and the RFID system can be updated.

Thus, in one embodiment, a method of improving the accuracy of an RFID-enabled supply chain system can include:

Applying RFID tags to products in a supply chain, and associating RFID code information with the products in the supply chain;

Tracking the products with RFID readers at multiple locations in a supply chain, such that the time and location of RFID reads are stored in a database of information about the supply chain;

Identifying an acceptable delay time between a first RFID reader and a second RFID reader in the supply chain, the first and second RFID readers being successive on an intended pathway for the products;

In response to a product being read by the first RFID reader but not yet having been read by the second RFID reader within the acceptable delay time, automatically issuing an alert indicating that a problem may have occurred.

In one embodiment, the present invention also includes a method of improving an existing RFID system by obtaining and storing information about missed reads in the system and identifying portals or other components of the system that are not performing as well as expected. For example, during a predetermined period of time such as a day, a week or a month, data from the intelligent data structure system of the present invention can be used to rank a plurality of system components (e.g., RFID readers or portals in a warehouse or manufacturing facility, or components at third-party locations) according to the number of problems occurred. "Problems" may be selected from the number or percentage of missed reads, time delays associated with reading RFID tags, reading errors, and the like. Those components with the highest problem level or with problem levels above a predetermined threshold can then be identified for repair work or upgrading. An automated message may be sent to an administrator or maintenance crew to call for inspection or repair. In some cases, the repair may require improving an environmental factor, such as reading radio signal interference, reducing humidity that may lead to condensation and obscured reads, reducing physical vibration, or modifying temperature.

Missed reads in a portion of the supply chain may also be due to problems in the supply chain other than reader problems per se, but may be due to handling problems prior to the reader that may occasionally damage RFID tags or due to environmental problems such as high humidity that may increase the moisture level of a corrugated box and thereby interfere with signal strength in subsequent reads. Identification of high problem spots in the supply chain, based on missed read data or other data in the intelligent data structure system, may be used to identify portions of the supply chain that need to be investigated and improved. For example, the improvement may include modification of physical handling processes for the objects associated with tags (boxes, carton, crates, pallets, etc.), such as reducing impact, scraping, bumping, stacking height, or other factors that might damage containers or tags.

After corrective action has occurred, continued data acquisition can verify that the problem level has dropped, and then other portions of the supply chain can be identified for improvement, particularly if the problem level exceeds some threshold associated with economic significance of the problem.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above systems and methods without departing from the scope of the invention, it is intended that all matter contained in the above description and shown in the accompanying drawings shall be interpreted as illustrative and not in a limiting sense.

What is claimed is:

1. A method of tracking tags at several successive points of a business process, said method comprising:
   attempting to read each tag at each successive point;
   populating a database with information corresponding to the reading of each tag at each successive point and the time of each reading;
   modifying part of the information in the database as a function of other information in the database; and
   using the modified information to track the tags through the business process.

2. The method of claim 1 wherein:
   populating comprises populating a data structure having a cell corresponding to each tag at each successive point and storing in each corresponding cell of the data structure information relating to whether or not each tag was read at each successive point;
   modifying one or more cells in the data structure as a function of other cells in the data structure; and
   using the modified data structure to track the tags.

3. The method of claim 2 wherein a first probability is stored in each cell corresponding to a particular tag when a reading of the particular tag is expected at a tag reading point and the reading of the particular tag occurs at the tag reading point, wherein a second probability is stored in each cell corresponding to a particular tag when a reading of the particular tag is expected at a tag reading point and the reading of the particular tag does not occur at the tag reading point, and wherein nothing is stored in each cell corresponding to a particular tag when a reading of the particular tag is not expected at a tag reading point and the reading of the particular tag does not occur at the tag reading point.

4. The method of claim 1 wherein the tags are associated with products which carry the tags, and wherein the products are handled in a supply chain during which the products and their tags pass several tag reading points, and further comprising adjusting the supply chain as a function of the modified information in the database.

5. The method of claim 4 wherein adjusting the supply chain comprises varying the supply of additional products to the supply chain as a function of the modified information in the database.

6. The method of claim 5 wherein the modified information comprises legacy information which is used to adjust the supply of additional products to the supply chain as a function of the modified information in the database.

7. The method of claim 4 wherein adjusting the supply chain comprises adjusting the handling of the products during the supply chain as a function of the modified information in the database.

8. The method of claim 7 wherein the modified information is used to impute information about a product and the information is used to adjust the handling of the products during the supply chain as a function of the modified information in the database.

9. A method of improving an RFID system for a business process associated with a supply chain, comprising the method of tracking tags at several successive points of the business process according to claim 1, and further comprising:
   using the information in the database to identify at least one problematic portion of the supply chain having a relatively high level of errors in reading tags, and
   physically modifying one or more of the at least one identified problematic portion of the supply chain to reduce the likelihood or error.

10. The method of claim 9, wherein physically modifying one or more of the at least one identified problematic portion of the supply chain comprises modifying a handling process for objects associated with the tags, or an environmental factor.

11. A system of tracking tags at several successive points of a business process, said system comprising:
    a reader for reading each tag at each successive point and the time of each reading;
    a database;
    a processor responsive to the reader for storing in the database information corresponding to the reading of each tag at each successive point and the time of each reading; and
    a tool for modifying part of the information stored in the database as a function of other information stored in the database whereby the modified information is used to track the tags through the business process.

12. The system of claim 11:
    Wherein the database includes a data structure having a cell corresponding to each tag at each successive point;

Wherein the processor stores in each corresponding cell of the data structure corresponding to whether or not each tag was read at each successive point; and Wherein the tool modifies one or more cells in the data structure as a function of other cells in the data structure.

13. The system of claim 12 wherein a first probability is stored in each cell corresponding to a particular tag when a reading of the particular tag is expected at a tag reading point and the reading of the particular tag occurs at the tag reading point, wherein a second probability is stored in each cell corresponding to a particular tag when a reading of the particular tag is expected at a tag reading point and the reading of the particular tag does not occur at the tag reading point, and wherein nothing is stored in each cell corresponding to a particular tag when a reading of the particular tag is not expected at a tag reading point and the reading of the particular tag does not occur at the tag reading point.

14. The system of claim 11 wherein the tags are associated with products which carry the tags, and wherein the products are handled in a supply chain during which the products and their tags pass several tag readers, and wherein the processor adjusts the supply chain as a function of the modified information in the database.

15. The system of claim 14 wherein the processor varies the supply of additional products to the supply chain as a function of the modified information in the database.

16. The system of claim 15 wherein the modified information comprises legacy information and further comprising a supply chain control for adjusting the supply of additional products to the supply chain as a function of the modified information in the database.

17. The system of claim 14 wherein the processor adjusts the handling of the products during the supply chain as a function of the modified information in the database.

18. The system of claim 17 wherein the modified information is used to impute information about a product and further comprising a calculator for adjusting the handling of the products during the supply chain as a function of the modified information in the database.

19. A method of supplying products carrying tags wherein the products are handled in a supply chain during which the products and their tags pass several tag reading points, said method comprising:

populating a database with information corresponding to the reading of each tag at each tag reading point and the time of each reading;

modifying part of the information in the database as a function of other information in the database; and adjusting the supply chain as a function of the modified information.

20. The method of claim 19 wherein:

populating a database comprises populating a data structure having a cell corresponding to each tag at each tag reading point and storing in each corresponding cell of the data structure information relating to whether or not each tag was read at each tag reading point;

modifying comprises modifying one or more cells in the data structure as a function of other cells in the data structure; and using the modified data structure information to adjust the supply chain.

21. The method of claim 20 wherein a first probability is stored in each cell corresponding to a particular tag when a reading of the particular tag is expected at a tag reading point and the reading of the particular tag occurs at the tag reading point, wherein a second probability is stored in each cell corresponding to a particular tag when a reading of the particular tag is expected at a tag reading point and the reading of the particular tag does not occur at the tag reading point, and wherein nothing is stored in each cell corresponding to a particular tag when a reading of the particular tag is not expected at a tag reading point and the reading of the particular tag does not occur at the tag reading point.

22. The method of claim 19 further comprising activating an alarm and/or implementing an adjustment when no reading of the particular tag is expected at a tag reading point and the reading of the particular tag occurs at the tag reading point.

23. The method of claim 19 wherein adjusting the supply chain comprises adjusting the supply of additional products to the supply chain as a function of the modified information in the database.

24. The method of claim 23 wherein the modified information comprises legacy information which is used to adjust the supply of additional products to the supply chain as a function of the modified information in the database.

25. The method of claim 19 wherein adjusting the supply chain comprises adjusting the handling of the products during the supply chain as a function of the modified information in the database.

26. The method of claim 25 wherein the modified information is used to impute information about a product and the imputed information is used to adjust the handling of the products during the supply chain as a function of the modified information in the database.

27. A method for use with an tag-enabled supply chain system for handling errors in tag tracking, comprising:

applying a tag with an electronic product code to a package;

tracking the package at a plurality of locations in a supply chain using tag readers in electronic communication with a central tag information system to create tracking information in a database that includes time and location information associated with the reading of the tag by the readers;

identifying the observed pathway of the product based on the tracking information;

comparing the observed pathway of the product to a compilation of valid pathways for products in the supply chain to determine if the observed pathway corresponds to a valid pathway;

storing the observed pathway in the database if it matches a valid pathway; and modifying the observed pathway if it corresponds to a valid pathway and storing the modified pathway in the database.

28. The method of claim 27 further comprising in response to the observed pathway not being a valid pathway, determining if the invalid pathway is likely due to one or more missed reads by RFID readers in the RFID-enable supply chain; and in response one or more missed reads being determined, adding information to the database to identify a valid pathway that the product traveled, the valid pathway including information about the readers that experienced missed reads.

29. A method of improving the accuracy of a tag-enabled supply chain system comprising:

applying tags to products in a supply chain, and associating tag code information with the products in the supply chain;

tracking the products with tag readers at multiple locations in a supply chain, such that the time and location of tag reads are stored in a database of information about the supply chain;

identifying an acceptable delay time between a first tag reader and a second tag reader in the supply chain, the first and second tag readers being successive on an intended pathway for the products;

in response to a product being read by the first tag reader but not yet having been read by the second tag reader within the acceptable delay time, issuing an alert indicating that a problem may have occurred.

* * * * *